United States Patent
Jimenez Cordon et al.

(10) Patent No.: US 11,751,192 B2
(45) Date of Patent: Sep. 5, 2023

(54) TETHERING POLICY FOR CELLULAR NETWORKS

(71) Applicant: Telefonaktiebolaget LM Ericsson (publ), Stockholm (SE)

(72) Inventors: Carlos Jimenez Cordon, Madrid (ES); Miguel Angel Muñoz de la Torre Alonso, Madrid (ES); Matthias Reinhold, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/697,824

(22) Filed: Mar. 17, 2022

(65) Prior Publication Data

US 2022/0210796 A1 Jun. 30, 2022

Related U.S. Application Data

(62) Division of application No. 17/056,964, filed as application No. PCT/EP2018/074345 on Sep. 10, 2018.

(30) Foreign Application Priority Data

Jun. 11, 2018 (EP) .................... 18382409

(51) Int. Cl.
*H04W 72/12* (2023.01)
*H04L 67/14* (2022.01)

(52) U.S. Cl.
CPC ......... *H04W 72/1221* (2013.01); *H04L 67/14* (2013.01)

(58) Field of Classification Search
CPC ......... H04L 67/14; H04L 69/16; H04L 29/08; H04W 72/1221; H04W 4/80; H04W 72/12

(Continued)

(56) References Cited

U.S. PATENT DOCUMENTS 8,553,701 B2 * 10/2013 Herzog ............... H04L 61/2553
370/395.2
8,943,554 B2 * 1/2015 Tran ........................ H04W 4/50
726/4

(Continued)

FOREIGN PATENT DOCUMENTS

| EP | 3162146 A1 | 5/2017 |
| WO | 2015199594 A1 | 12/2015 |
| WO | 2018036613 A1 | 3/2018 |

OTHER PUBLICATIONS

3rd Generation Partnership Project, "3rd Generation Partnership Project; Technical Specification Group Core Network and Terminals; Interface Between the Control Plane and the User Plane Nodes; Stage 3 (Release 15)", Technical Specification, 3GPP TS 29.244 V15.0.0, Dec. 1, 2017, pp. 1-157, 3GPP.

*Primary Examiner* — Man U Phan

(74) *Attorney, Agent, or Firm* — COATS & BENNETT, PLLC

(57) ABSTRACT

The invention relates to a method for operating a gateway wherein the method comprises to detect a downlink data packet session transmitted to the first user entity, and to amend the lifetime indicator in at least some of the data packets of the detected downlink data packet session such that the data packets for which the lifetime indicator has been amended, have reached the end of the lifetime and cannot be transmitted further when arriving at the first user entity.

5 Claims, 8 Drawing Sheets

(58) Field of Classification Search
USPC .......................................................... 370/328
See application file for complete search history.

(56) References Cited

U.S. PATENT DOCUMENTS

| | | | |
|---|---|---|---|
| 8,949,439 B1* | 2/2015 | Sahuguet | H04W 88/04 |
| | | | 709/227 |
| 9,276,936 B2* | 3/2016 | Vishnubhatt | H04L 63/10 |
| 9,485,241 B2 | 11/2016 | Paczkowski et al. | |
| 9,755,919 B2* | 9/2017 | Kersch | H04L 67/535 |
| 9,900,218 B2 | 2/2018 | Perez Martinez et al. | |
| 10,070,374 B2* | 9/2018 | Jin | H04L 41/0893 |
| 10,237,183 B2 | 3/2019 | Srivastav et al. | |
| 10,412,633 B1* | 9/2019 | Kotecha | H04L 43/0888 |
| 10,511,967 B2* | 12/2019 | Kang | H04L 63/205 |
| 2012/0240197 A1 | 9/2012 | Tran et al. | |
| 2012/0310900 A1 | 12/2012 | Monteith et al. | |
| 2013/0107783 A1* | 5/2013 | Shaw | H04W 4/06 |
| | | | 370/312 |
| 2013/0273902 A1* | 10/2013 | Bolingbroke | H04W 76/10 |
| | | | 455/422.1 |
| 2014/0317278 A1 | 10/2014 | Kersch et al. | |
| 2016/0295622 A1* | 10/2016 | Huang | H04W 24/10 |
| 2017/0295600 A1* | 10/2017 | Hassan | H04W 12/08 |
| 2021/0176176 A1* | 6/2021 | Yamamoto | H04W 76/14 |

* cited by examiner

| Feature Octet / Bit | Feature | Interface | Description |
|---|---|---|---|
| 5/1 | BUCP | Sxa | Downlink Data Buffering in CP function is supported by the UP function. |
| 5/2 | DDND | Sxa | The buffering parameter 'Downlink Data Notification Delay' is supported by the UP function. |
| 5/3 | DLBD | Sxa | The buffering parameter 'DL Buffering Duration' is supported by the UP function. |
| 5/4 | TRST | Sxb, Sxc | Traffic Steering is supported by the UP function. |
| 5/5 | FTUP | Sxa, Sxb | F-TEID allocation / release in the UP function is supported by the UP function. |
| 5/6 | PFDM | Sxb, Sxc | The PFD Management procedure is supported by the UP function. |
| 5/7 | HEEU | Sxb, Sxc | Header Enrichment of Uplink traffic is supported by the UP function. |
| 5/8 | TREU | Sxb, Sxc | Traffic Redirection Enforcement in the UP function is supported by the UP function. |
| 6/1 | EMPU | Sxa, Sxb | Sending of End Marker packets supported by the UP function. |
| 6/2 | TEEU | Sxb, Sxc | Tethering Enforcement is supported by the UP function. |

Feature Octet / Bit: The octet and bit number within the Supported-Features IE, e.g. "5 / 1".
Feature: A short name that can be used to refer to the octet / bit and to the feature.
Interface: A list of applicable interfaces to the feature.
Description: A clear textual description of the feature.

FIG. 3

TETHERING POLICY FOR CELLULAR NETWORKS

RELATED APPLICATIONS

The present application is a divisional of U.S. patent application Ser. No. 17/056,964, which was filed on Nov. 19, 2020, which is a national stage application of PCT/EP2018/074345, which was filed Sep. 10, 2018, and claims benefit of European Application No. EP 18382409.3, which was filed Jun. 11, 2018, the disclosures of each of which are incorporated herein by reference in their entirety.

TECHNICAL FIELD

The present application relates to a method for operating a gateway configured to control data packets of a data packet session exchanged in a cellular network, to a method for operating a policy control entity controlling a policy of the first user entity, and to a method for operating a session control entity configured to control the data packet sessions of the first user entity.

Furthermore, the corresponding gateway, the policy control entity, and the session control entity are provided. Additionally, a system comprising the gateway, the policy control entity, and the session control entity is provided. The application further relates to a computer program and a carrier comprising the computer program.

BACKGROUND

Tethering is a practice of using a mobile device, also called user entity hereinafter as a hotspot to connect other devices to the Internet such as laptops or other mobile devices or phones. Any of the latest operating systems used in a mobile device offers Internet access capabilities using the tethering mechanism. Operators of mobile networks are interested in applying a different policy such as blocking the corresponding data traffic, reporting the use of the tethering mechanism or applying a different quality of service if a device is detected using the tethering mechanism. Furthermore, a different tariff may be applied. This is based on the fact as the tethering traffic is consuming a significant bandwidth for which the infrastructure of the cellular network is not dimensioned for. Furthermore, in case the subscriber has a flat tariff subscription, tethering traffic is not charged at all.

FIG. 1 shows the functional elements and interfaces involved in this context. The packet Gateway (PGW) control plane function (PGW-C) provides the functionality of the packet gateway as defined by TS 23.401 and TS 23.402 wherein the control plane function comprises the serving gateway control plane function 10, the PDN (packet data network) gateway control plane function 15 and the traffic detection function, TDF-C 20. The policy and charging enforcement function, PCEF, is defined in TS 23.203 except for the functions that are performed by the packet gateway user plane.

The PGW user plane function (PGW-U) provides the UP (User Plane) functionality of the PGW. The functionality of PGW-U is defined in TS 23.214 and comprises the Serving Gateway user plane function 30, the PDN Gateway user plane function 35, and the TDF user plane function 40.

Sxb is the reference point between PGW-C 15 and PGW-U 35. In the following this reference point is simply referred to as Sx. It is specified in TS 29.244.

In the 5G Architecture, there are new network functions (NFs) and interfaces as shown in FIG. 2. Actually, the NFs in the 5GCore follow an SBA (Service Based Architecture) and communicate using Service based REST (Representational State Transfer) interfaces.

However, with regards to the functions:
SMF (Server Management Function) 50 and PGW-C 15 are equivalent, so are UPF (User Plane Function) 60 and PGW-U 35. Also, TDF-C 20 merges into SMF (Session Management Function) 50, and TDF-U 40 into UPF 60. 3GPP has agreed to standardize N4 (btw UPF and SMF) as an evolution of Sx specification.

As shown in FIG. 2 a user entity 70 which has the right to use the cellular network in view of the fact that the subscriber is identified, transmits its own data packets 71 through the cellular network, but also data packets 72 from one of the other entities such as the entities 81 to 84 which could be implemented as a laptop computer, another mobile entity, a PDA, etc.

3GPP TS 29.244 specifies the Sx interface and defines the procedure for packet detection rule, PDR, matching and associated enforcements when a user plane packet is received by the user plane function 60, however, there is no mechanism to control the use of the data packets occurring from the use of the tethering mechanism, such as the packets 72 shown in FIG. 2.

Accordingly, a need exists to be able to apply a policy especially for data packets in a cellular network which are sent using the tethering mechanism.

SUMMARY

This need is met by the features of the independent claims. Further aspects are described in the dependent claims.

According to a first aspect a method for operating a gateway configured to control data packets of a data packet session exchanged in a cellular network with a first user entity is provided. The first user entity is identified by the cellular network through subscription data by which the first user entity is linked to a subscriber. A second entity is connected to the first user entity via a tethering mechanism in which the second entity uses transmission capabilities of the first user entity to exchange data packets through the cellular network. Each data packet comprises a lifetime indicator indicating a remaining lifetime of the corresponding data packet. The gateway detects a downlink data packet session transmitted to the first user entity and amends the lifetime indicator in at least some of the data packets of the detected downlink data packet session such that the data packets for which the lifetime indicator has been amended have reached the end of the lifetime and cannot be transmitted further when arriving at the first user entity.

With the above described method the gateway can control the data packet transmission in such a way that the data packets will not be transmitted further from the first user entity to the second entity as the lifetime has ended at the first user entity.

Furthermore, the corresponding gateway configured to control data packets is provided.

Furthermore, a method for operating a policy control entity is provided configured to control a policy in a cellular network applied to the first user entity for exchanging data packet sessions with the cellular network, wherein the first user entity is identified by the cellular network through subscription data by which the first user entity is linked to a subscriber. The policy control entity determines the policy for the data packet session exchanged through the cellular network with the first user entity. Furthermore, it is determined whether the policy comprises a tethering policy indicating how to handle a tethering mechanism in which a second user entity uses transmission capabilities of the first user entity to exchange data packets of a data packet session through the cellular network. If this is the case a session control entity configured to control the data packet sessions in which the first user entity is involved is instructed to enforce the tethering policy.

Furthermore the policy control entity is provided configured to operate as discussed above or as discussed in further detail below.

When the policy control entity determines that the tethering policy should be applied it instructs the session control entity to enforce the tethering policy.

Furthermore, a method for operating a session control entity is provided configured to control data packet sessions of the first user entity in the cellular network, wherein the first user entity is identified in the cellular network through subscription data by which the first user entity is linked to a subscriber. According to the method a session policy is received from the policy control entity of the cellular network which should be used to control a data packet session in which the first user entity is involved. Furthermore, it is determined whether the session policy comprises a tethering policy indicating how to handle a tethering mechanism in which a second user entity uses transmission capabilities of the first user entity to exchange data packets of a data packet session through the cellular network. If a tethering policy is present in the session policy, the session control entity selects a gateway for handling the data packet session with the first user entity which is capable of applying the tethering policy. A session request is then transmitted to the selected gateway instructing the gateway to apply the tethering policy.

Furthermore the corresponding session control entity is provided which is configured to operate as discussed above or as discussed in further detail below.

When it is detected that a tethering policy should be applied gateways may exist which are not able to apply the tethering policy. Accordingly, the session control entity selects a gateway which is able to enforce the tethering policy.

Furthermore, a method for operating a gateway configured to control data packets of a data packet session exchanged in a cellular network with a first user entity is provided which is identified by the cellular network through subscription data by which the first user entity is linked to a subscriber. A second entity is connected to the first user entity via a tethering mechanism in which the second entity uses transmission capabilities of the first user entity to exchange data packets through the cellular network. The gateway detects for an uplink connection request for the data packet session from the first user entity to the cellular network that the second entity is connected to the first user entity via the tethering mechanism and is transmitting data packets through the cellular network through the first entity. The gateway can then lower the bandwidth for the data packets of the data packet session exchanged through the cellular network to a predefined level.

Here the gateway may not completely block the use of the tethering mechanism, but may throttle the bandwidth to a defined value when a tethering is detected. Additionally the gateway is provided configured to operate as discussed above or as discussed in further detail below.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other combinations unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

FIG. 3 shows a table including an example how information about a tethering enforcement may be exchanged in an association procedure.

DETAILED DESCRIPTION

Figure 1:
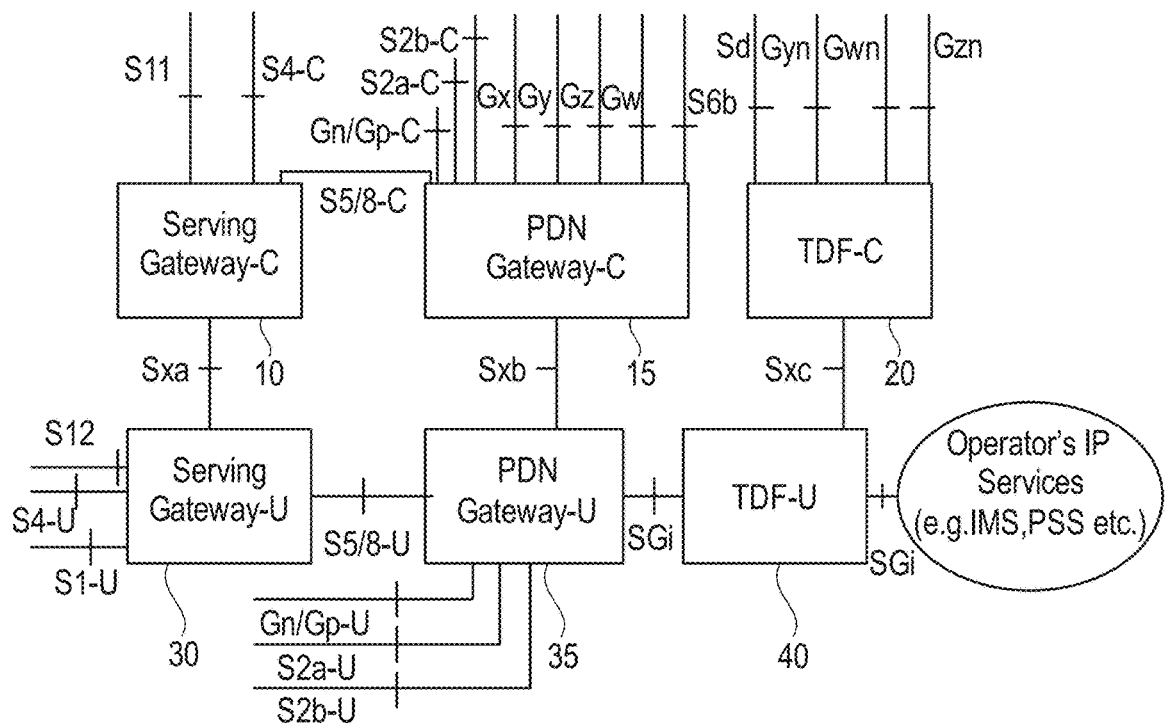
FIG. 1 shows a schematic view of the 4G architecture with the separation of the control and user plane as known in the art.

In the following, embodiments of the invention will be described in detail with reference to the accompanying drawings. It is to be understood that the following description of embodiments is not to be taken in a limiting sense. The scope of the invention is not limited by the embodiments described hereinafter or by the drawings, which are to be illustrative only.

The drawings are to be regarded as being schematic representations, and elements illustrated in the drawings are not necessarily shown to scale. Rather the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term user entity or mobile entity or user equipment, UE, refers to a device for instance used by a person, the user, for his or her personal communication. It can be a telephone type of device, for example a telephone or a cellular telephone, a mobile station, cordless phone, or a personal digital assistant type of device like laptop, notebook, notepad, tablet equipped with a wireless data connection. The user entity may also be associated with non-humans like animals, plants, or machines. The user entity can be equipped with a SIM, subscriber identity module, or electronic SIM comprising unique identities such as the IMSI (International Mobile subscriber identity), TMSI (temporary Mobile subscriber identity) or GUTI (globally unique temporary UE identity) associated with the user using the UE. The presence of a SIM within the UE customizes the UE uniquely with a subscription of the user. For the sake of clarity, it is to be noted that there is difference, but a tight connection between the user and the subscriber. The user gets access to the network by acquiring subscription to the network and by that becomes a subscriber within the network. The network then recognizes the subscriber and uses the associated subscription to identify related subscriber data. A user can be the actual user of the UE and the user may also be the one owing the subscription, but the user and the owner of the subscription may also be different.

In the following a mechanism is described to support tethering policies in the context of 4G or 5G networks supporting control plane user plane separation, CUPS. By way of example an extension to the 3GPP Sx or N4 reference point is proposed and the packet flow control protocol, PFCP, may be adapted to allow the control plane to activate the tethering policies at the user plane.

As will be explained below a simple solution is provided to detect or avoid the use of a tethering mechanism or to notify other entities in a cellular network of the use of the tethering mechanism.

Especially for the packet gateway control plane, the traffic detection function control plane and the session management function a mechanism is proposed to activate tethering policies in the packet gateway user plane, traffic detection function user plane or user plane function.

For simplicity in the following the term UPF will be used to refer to the 5G core user plane function, but also to the packet gateway user plane or the traffic detection function user plane.

The solution proposed below applies to the following scenarios:
 a simple UPF which does not have capabilities to run complex tethering detection mechanisms such as heuristics or TCP fingerprinting.
 a complex UPF which is able to run complex tethering mechanisms and can apply heuristics or TCP fingerprinting. As existing mechanisms do not guarantee a 100% accuracy, by way of example in TCP fingerprinting TTL (time to life) based tethering detection can fail if the user hack the TTL. The solution proposed below may act as a gap filter and provides a more robust mechanism.

Furthermore the solution proposed below can apply to use cases with subscribers having a flat tariff and subscribers having a non-flat tariff.

Subscribers with Flat Tariff

The mechanism is described in connection with FIG. 4. Before any message exchange the PFCP Association is carried out and the capabilities of the user plane functions are exchanged. In step S11 the user plane function 100 transmits a PFCP Association request to the session management function, SMF, 500. At the PFCP Association procedure between the UPF 100 and the SMF entities 500 the existing mechanism is extended to report the UPF capabilities with a new capability such as the tethering enforcement. An example of such exchanges shown in table of FIG. 3 where the last line indicates the TEEU feature meaning that tethering enforcement is supported by the user plane function. This allows the SMF 500 to know which user plane functions 100 support this capability and can take this information into account when selecting a user plane function 100.

In step S12 the SMF 500 transmits the association response to the user plane function 100.

Steps S13 to S20 show the PDU session establishment procedure. In step S13 the UE 70 transmits the PDU session establishment request to an access and mobility function, AMF 85. AMF 85 transmits a Namf session create message to the SMF 500 in step S14 which transmits in step S15 a policy request to the PCF 200. In step S16 the PCF 200 retrieves the subscriber's policy profile which is stored in the user data repository by sending a UDR policy profile request including the IMSI and MSISDN. In step S17 the UDR 90 responds with a UDR policy profile response indicating that the tethering policy applies. If the tethering policy applies the PCF installs the tethering policy in a session management function 500 through Npcf, policy response, Npcf being the interface the PCF offers to consumers (S18)). The current 5G policy control and charging rules, PCC rules, can be extended for this.

SMF 500 then performs a UPF selection and selects a UPF with tethering capabilities. The SMF 500 triggers a PFCP session establishment request in step S19 including the corresponding packet detection rules, PDR, and the corresponding enforcement actions such as forwarding action rule (FAR), QER (QoS Enforcement Rule), URR (Usage Reporting Rule), etc. to apply to this PDU session. Especially the SMF 500 can instruct the UPF 100 to activate the tethering mechanism. Therefore the forwarding action rule, FAR, may be extended. Alternatively the SMF 500 can enable this functionality in the user plane function 100 on a per node basis, such as for all user sessions, or the UPF may be locally configured to apply the tethering policy described below.

In step S20 the UPF transmits the session establishment response. Accordingly the PDU session establishment continues and after that an application traffic, e.g. Facebook data is transmitted to an application server 95 from a device such as any of the devices 81 to 84 shown in FIG. 2 using the tethering mechanism so that it is transmitted using the subscription of the user entity 70. In step S21 the UE 70 starts the application traffic, especially traffic pertaining to the application such as Facebook, Netflix, etc. using the tethering mechanism so that the data packets actually come from any of the devices 81 to 84 of FIG. 2. In step S21 a TCP synchronization message (TCP SYN) is sent to the user plane function 100 which forwards the message in step S22 to the application server 95. In step S23 the acknowledgement message (TCP SYN/ACK) is sent from the application server to the UPF 100 wherein the acknowledgement message comprises a lifetime indicator such as time to life, TTL which is set to a certain value. The TTL value represents a hop limit and describes a mechanism that limits the lifespan or lifetime of a data packet in the network. When the timespan or the hop limit is reached, the data packet is disregarded or has to be revalidated.

In step S24 the UPF 100 analyses the incoming traffic. When the UPF detects a downlink traffic where it is assumed that all downlink packet detection rules, PDRs, include a forwarding action rule in which the TTL can be modified, and when the mechanism is to be applied to all downlink traffic for the UE PDU session, the UPF 100 sets the TTL value to 0 in the downlink traffic. As the downlink packet will be GTP (GPRS tunneling protocol)-U encapsulated, the next hop for the TTL check will be the UE 70.

By way of example intermediate hops like the radio access network will not check the TTL value in the inner packet which corresponds to the original packet with a TTL value being set by the sending server.

Figure 2:
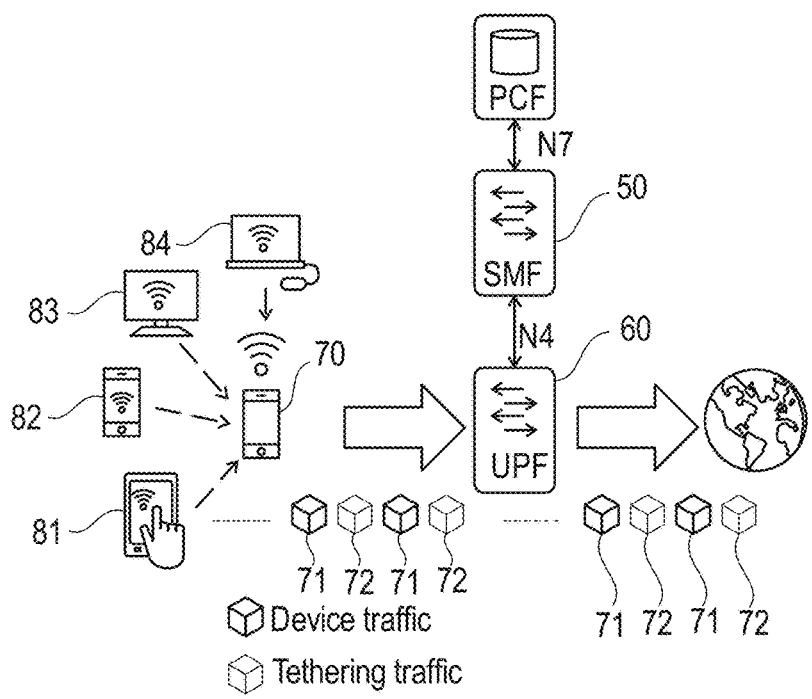
FIG. 2 shows a similar part of a network in a 5G architecture when a tethering mechanism is used.

Accordingly, the user plane function amends the lifetime indicator such as the TTL value in such a way that it can reach the user entity 70 which has a subscription to the cellular network, but it cannot be forwarded from the user entity 70 to another entity such as one of the entities 81 to 84 shown in FIG. 2. In the example shown the lifetime indicator was set to 0. However, it should be understood that when the UPF 100 is located at a different position within the network, the lifetime indicator may be set to another value such that it cannot be further transmitted when arriving at the user entity 70.

For the mechanism to amend the TTL value different options exist:

As a first alternative the UPF modifies the TTL for all downlink IP packets for any protocol on top of the IP layer. As an alternative the UPF 100 modifies the TTL value only for specific protocols on top of the IP layer such as TCP (Transmission Control Protocol) or UDP (User Datagram Protocol). By way of example when the TCP protocol is used the user plane function 100 may only modify the data packets for a downlink TCP acknowledgement message as shown in FIG. 4 and possible retransmissions. When the UDP is used, the user plane function may only modify the TTL for the first IP packets such as the first two or three packets in each flow. Accordingly in step S25 the SMF 500 transmits the acknowledgement message with the amended TTL value to the UE 70. In step S26 the IP protocol stack of the user entity 70 checks the TTL value and drops the packet before sending it on to the tethered device such as one of the devices 81 to 84. This results in a tethering traffic blocking, but traffic for the user entity 70 itself will be kept without any change.

The application traffic may continue and in step S27 in case the UPF is instructed to detect and report if tethering is happening for this PDU session, by way of example for statistical reasons, the UPF 100 can detect the presence or absence of the subsequent uplink TCP acknowledgement message which is normally present for the TCP case. Accordingly, in step S27 a timeout is detected for the monitored acknowledgement.

By way of example if the uplink TCP acknowledgement is detected, the UPF can conclude that no tethering mechanism is used. However, if the uplink TCP acknowledgement is not detected, and the UPF times out for no response as the UE has blocked the packets for devices 81 to 84 so that the tethering mechanism was active, the tethering maybe reported. Accordingly in step S28 the user plane function 100 can report in the session report that the tethering mechanism was used. For the reporting two alternatives are discussed:

the Sx-N4 PFCP report types may be extended with a new type so that the PFCP session report request is triggered at the time the tethering is detected. The report type, IE may be encoded as discussed in 3GP 29.244. It indicates the type of the report the user plane function sends to the control plane function. In this context Octet 5 can be encoded as follows:

Octet 5 shall be encoded as follows:

Bit 1—DLDR (Downlink Data Report): when set to 1, this indicates Downlink Data Report Bit 2—USAR (Usage Report): when set to 1, this indicates a Usage Report Bit 3—ERIR (Error Indication Report): when set to 1, this indicates an Error Indication Report.

Bit 4—UPIR (User Plane Inactivity Report): when set to 1, this indicates a User Plane Inactivity Report.

Bit 5—TETR (Tethering Report): when set to 1, this indicates a Tethering Report.

Bit 6 to 8—Spare, for future use and set to 0.

At least one bit shall be set to 1. Several bits may be set to 1.

As an alternative the existing URR, usage reporting rule, maybe extended with a binary flag indicating tethering yes or no. In step S29 the SMF 500 transmits the PFCP session report response to the UPF 100.

The above described mechanism describes a simple tethering detection and reporting mechanism and does not rely on complex heuristics or TCP fingerprinting techniques running on the UPF.

In the above solution a complete blocking of the tethering mechanism was proposed. It allows the network service provider to offer a tethering option plan on top of the subscriber's existing data plan.

Subscribers with not Flat Tariff

For subscribers with a non-flat tariff it may be advantageous to avoid the situation that the subscriber is overcharged. The message exchange discussed above in connection with FIG. 4 can be also applied in this scenario, however, in step S24 the UPF 100 may report the volume of 0 bytes for those packets where the lifetime indicator, TTL, has been changed. Nevertheless the UPF will store the actual volume of those data packets where the TTL value was changed. Only in case the TCP connection is successfully established, by way of example the UPF 100 detects the subsequent uplink TCP acknowledgement which indicates that no tethering is applied for the flow, the UPF will report the stored volume, by way of example the volume report corresponds to the volume for the acknowledgement plus the previously stored volume for the SYN/ACK. In case of UDP traffic, the user plane function may check if there is a subsequent uplink traffic after the downlink traffic with the TTL changed. Accordingly packets with an amended TTL will only be counted if there is an uplink reply. If there is no uplink reply the packet has not reached the final destination and the subscriber should pay for these packets.

Tethering Throttling Policy

The above described mechanisms describe situations where the network operator could completely block the use of the tethering mechanism. However, it might be necessary to apply a less restrictive policy like a throttling. In this case the bandwidth for the tethered flows may be lowered, so instead of setting the TTL to 0 for downlink packets, the UPF may throttle the flow to a configured bandwidth for which the uplink traffic UPF has detected the tethering, e.g.

the TTL has decreased. In such a situation both the uplink and downlink traffic may be throttled. By way of example when the tethering has been detected for the uplink as discussed in connection with FIG. 4, a particular IP flow is identified for which the tethering mechanism is used. This flow is identified by the 5 tuple including the source IP, the destination IP, the source port, the destination port and the IP protocol. Accordingly, the UPF can apply the throttling for any subsequent packets in that flow both for the uplink and downlink. The throttling may occur by using known mechanisms such as the leaky bucket algorithm or a token bucket algorithm. By way of example the individual packets are forwarded as they arrive if the arrival rate is below the bandwidth limit and the buffer is empty. Packets bursts exceeding the bandwidth limit can be queued as they arrive and packets are extracted from the queue at the rate of the bandwidth limit. The exact extracting timing can be dictated by the arrival of other packets for any user to the UPF and the packets arriving when the service session queue is full may be dropped.

Hybrid Access UPF

The above described mechanism is also valid on hybrid access UPF. In a hybrid access UPF, whatever the access is, be it 5G, Wi-Fi or fixed network, downlink traffic will always be encapsulated so the setting of the TTL to 0 will always make sure that the next hop for the TTL check will be the user entity 70 as intermediate hops like the radio access network, Wi-Fi, or BNG (boarder network Gateway) will not check the TTL value in the inner packet.

Furthermore, it is possible to extend the solutions discussed above to each leg such as the 5G access leg, the fixed access leg or the Wi-Fi access leg. By way of example a policy stored in the UDR database as part of the subscriber's policy profile could be installed to apply the tethering policy only for some legs, e.g. in dependence on the leg used, e.g. only for the Wi-Fi and 5G accesses and not for the fixed access assuming that the fixed access does not have a bandwidth problem. Accordingly, in this situation the application of the tethering policy depends on the technology used in the access leg with which a network is accessed.

CONCLUSIONS

Figure 5:
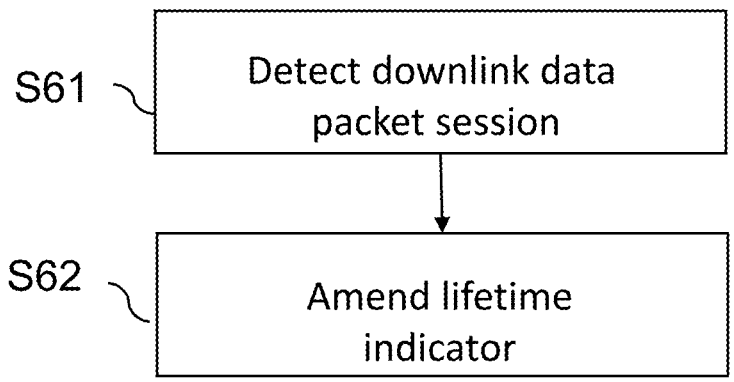
FIG. 5 shows an example flowchart carried out at a gateway controlling the data packet flow to enforce a tethering policy.

FIG. 5 summarizes some of the main steps carried out at the user plane function 100. The user plane function can be a UPF of the 5G network, however, the UPF may also be the PDN gateway in the 4G architecture or the traffic detection function of the 4G architecture. In a first step S61 the user plane function or gateway detects a downlink data packet session transmitted to the first user entity, by way of example the downlink traffic from the application server 95 to the user entity 70. In step S62 the gateway or user plane function then amends the lifetime indicator for at least some of the data packets of the detected downlink data packet session. The amendment of the lifetime indicator such as the TTL is such that the packets will arrive at the user entity through which the data packets are exchanged through the wireless or cellular network, but the lifetime is amended such that they cannot be transmitted further from the user entity so they cannot be transmitted from the user entity 70 to any of the entities 81 to 84.

This mechanism was discussed above in connection with FIG. 4, especially step S24.

Figure 6:
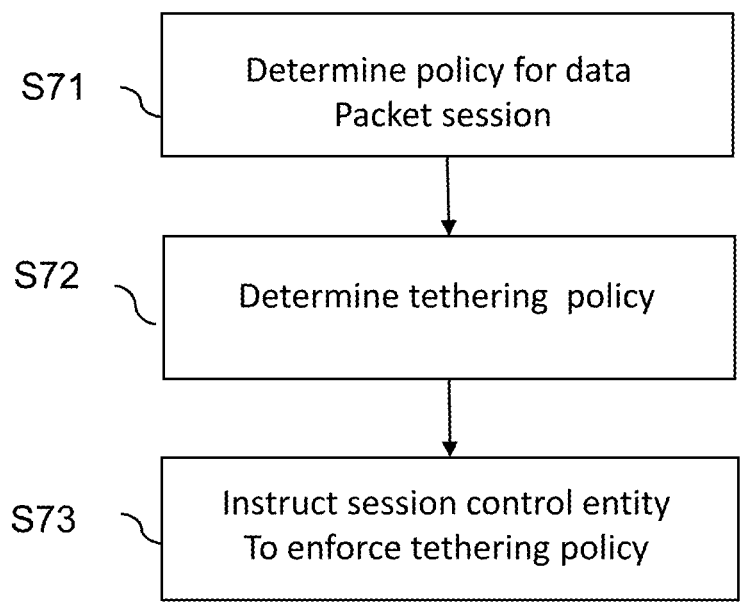
FIG. 6 shows an example flowchart of a method carried out at a policy control entity controlling the policy applied to a user entity using a tethering mechanism.

FIG. 6 summarizes some of the more relevant steps carried out at the policy control entity such as the PCF 200 discussed in connection with FIG. 4. The user entity 75 is the user entity which can be identified in the network through subscription data. In step S71 the policy control entity such as PCF 200 of FIG. 4 determines the policy for the data packet session exchanged through the cellular network with the user entity 70. In step S72 the policy control entity determines whether the policy comprises a tethering policy indicating how to handle the tethering mechanism in which the other user entity which is not identified in the network uses the transmission capabilities and transmission rights of the user entity 70 to exchange data packets through the network. If it is determined in step S72 that the tethering policy has to be applied, the policy control entity instructs the session control entity which is configured to control the data packet sessions in which the first user entity is involved to enforce the tethering policy.

This was discussed above in connection with FIG. 4, step S16.

Figure 4:
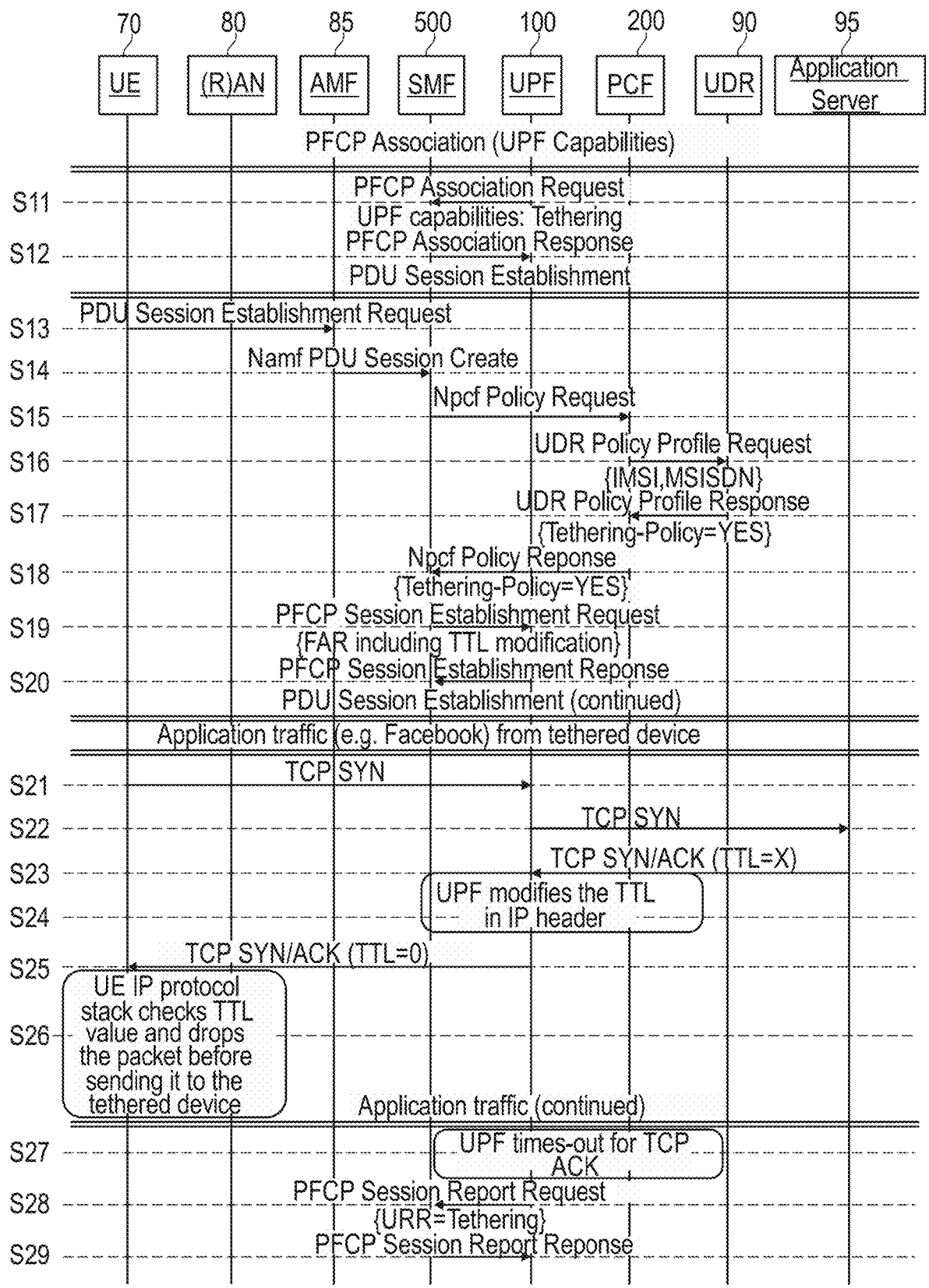
FIG. 4 shows an example message exchange between the different entities for activating and enforcing tethering policies.
Figure 7:
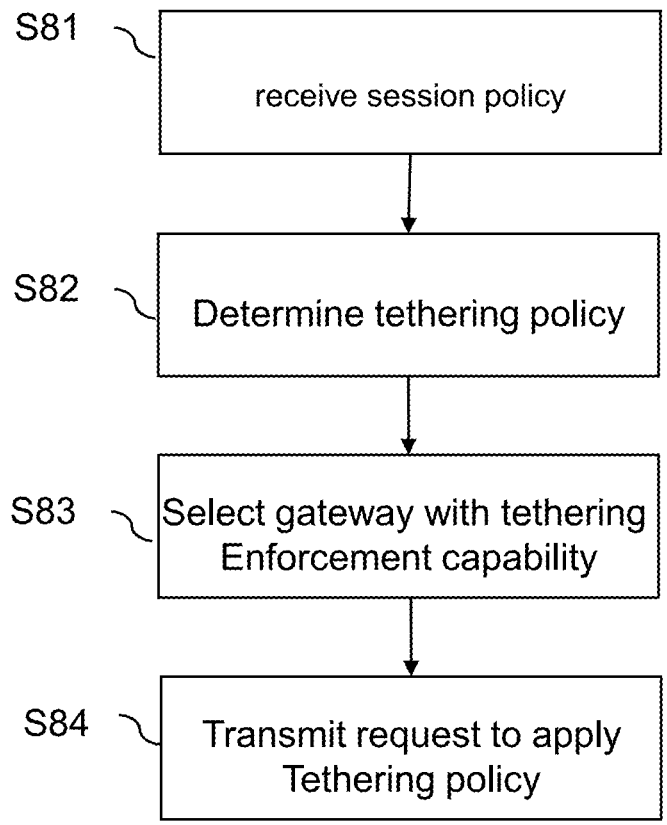
FIG. 7 shows an example flowchart of a method carried out at a session control entity controlling the data packet session of a user entity using a tethering mechanism.

FIG. 7 summarizes some of the steps carried out by the session control entity such as the session management function 500 of FIG. 4. In step S81 the session control entity receives a session policy from the policy control entity which should be used to control the data packet session in which the user entity 70 is involved. In step S82 it is determined whether the session policy comprises a tethering policy indicating how to handle a tethering mechanism. In step S82 it is assumed that it is determined that the tethering policy should be applied. Accordingly, in step S83 the session control entity selects a gateway which has the capability of enforcing the tethering policy. In step S84 the request to apply the tethering policy is then transmitted to the corresponding selected gateway.

This was discussed above in connection with step S19 of FIG. 4.

Figure 8:
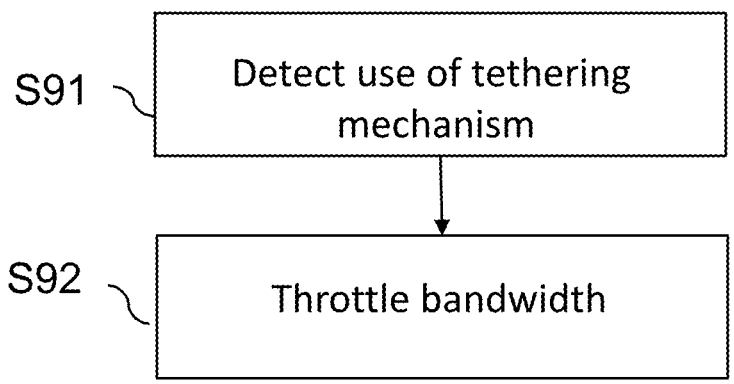
FIG. 8 shows another example flowchart of a method carried out at a gateway controlling the use of a tethering mechanism.

FIG. 8 summarizes the steps carried out at a gateway or user plane function. In the mechanism described in connection with FIG. 8 there is no complete blocking of the detected packets relating to the tethering mechanism, but in step S91 the tethering mechanism is detected, by way of example for an uplink connection request. As discussed in connection with FIG. 4 the tethering mechanism may be detected when the further uplink acknowledgement is not received from the mobile entity. When the use of the tethering mechanism is detected for a packet flow, the bandwidth may be throttled in step S92.

Figure 9:
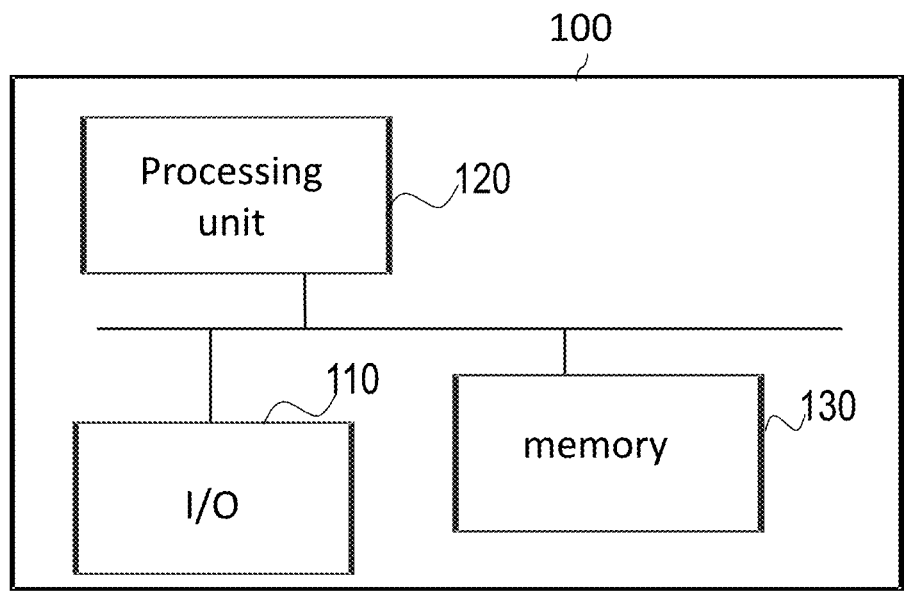
FIG. 9 shows an example schematic representation of a gateway configured to apply a tethering policy.

FIG. 9 shows a schematic architectural view of the gateway or user plane function 100 configured to control the data packets of the data packet flow and which can amend the lifetime indicator such as the TTL as discussed above. In IPV4 it is a field in the IP header, in IPV6, it is renamed as hop limit, but both parameters are indicators of the remaining lifetime of the packet. The gateway or user plane function 100 comprises an interface or input/output 110 configured to transmit user data or control messages to other entities and to receive user data or control messages from other entities. The interface 110 is specially qualified to receive the indication to apply the tethering policy wherein the interface may also be used to receive and transmit the data packets. The user plane function furthermore comprises a processing unit 120 which is responsible for the operation of the user plane function 100 as discussed above. The processing unit 120 comprises one or more processors and can carry out instructions stored on a memory 130, wherein the memory can include a read-only memory, a random access memory, a mass storage, a hard disk, or the like. The memory can furthermore include suitable program code to be executed by the processing unit 120 so as to implement the above described functionalities in which the user plane function is involved.

Figure 10:
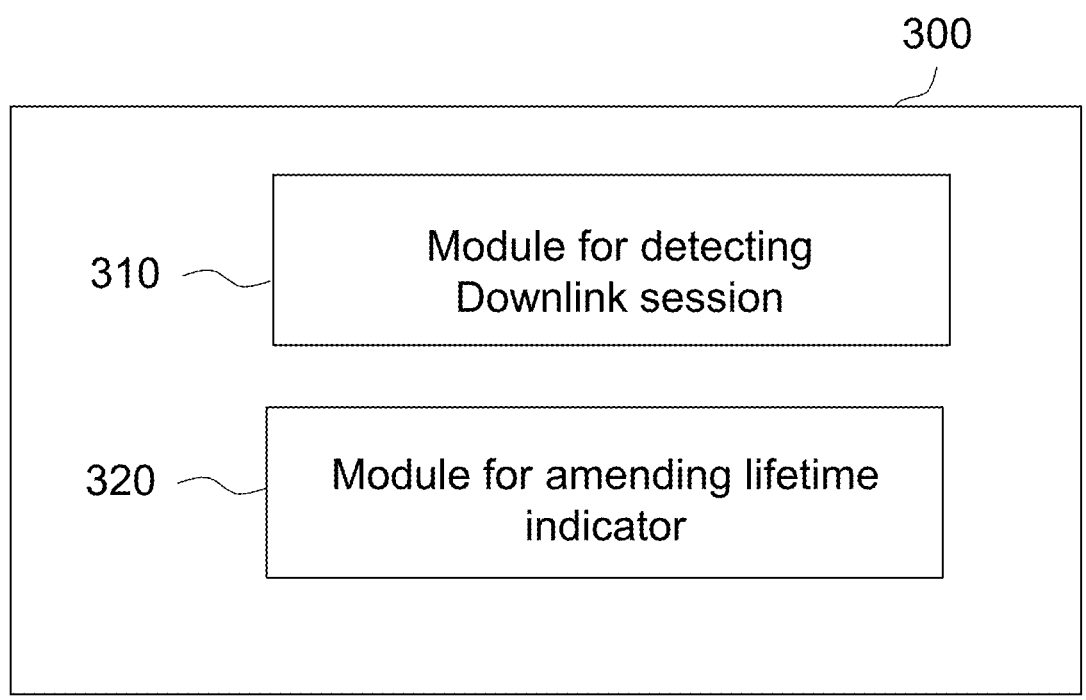
FIG. 10 shows another example schematic representation of a gateway configured to apply a tethering policy.

FIG. 10 shows another example representation of a user plane function or gateway 300 which comprises a module 310 for detecting the downlink data packet session transmitted to the user entity which is identified in the network by its subscription data. Furthermore, a module 320 is provided configured to amend the lifetime indicator as discussed above.

Figure 11:
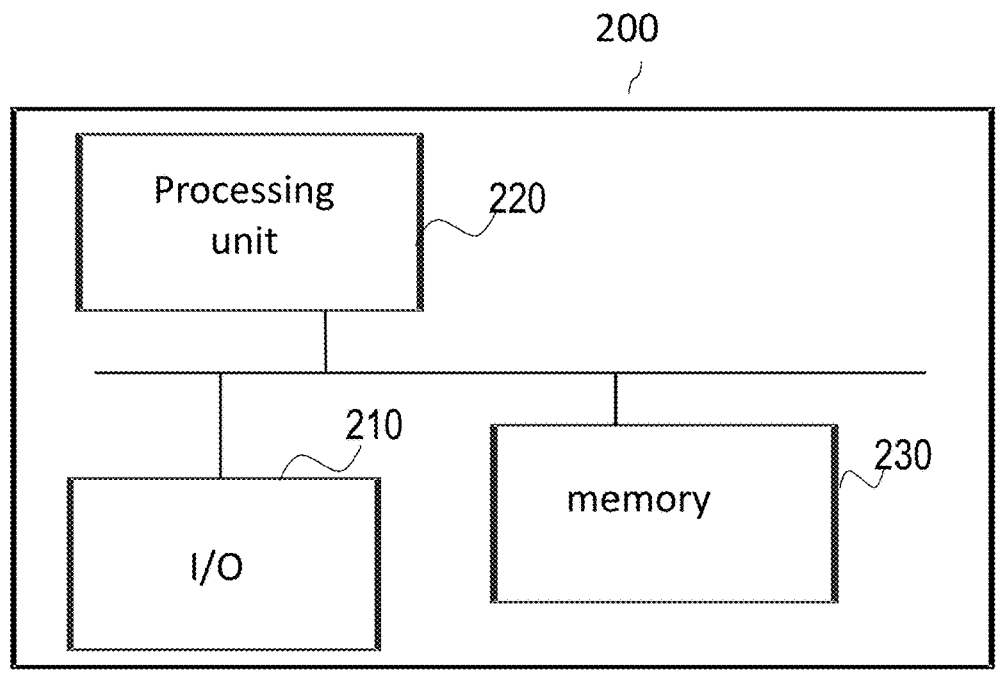
FIG. 11 shows an example schematic representation of a policy control entity controlling a tethering policy to be applied to a data packet flow.

FIG. 11 shows a schematic architectural view of a policy control entity 200 such as the PCF 200 discussed in connection with FIG. 4. The policy control entity 200 comprises an interface or input/output 210 provided for transmitting user data or control messages and provided for receiving user data or control messages from other entities. The policy control entity comprises a processing unit 220 which is responsible for the operation of the entity 200. The processing unit 220 comprises one or more processors and can carry out instructions stored on a memory 230, wherein the memory may include a read-only memory, a random access memory, a mass storage, a hard disk, or the like. The memory 230 can furthermore include suitable program code to be executed by the processing unit 220 so as to implement the above described functionalities in which the policy control entity 200 is involved.

Figure 12:
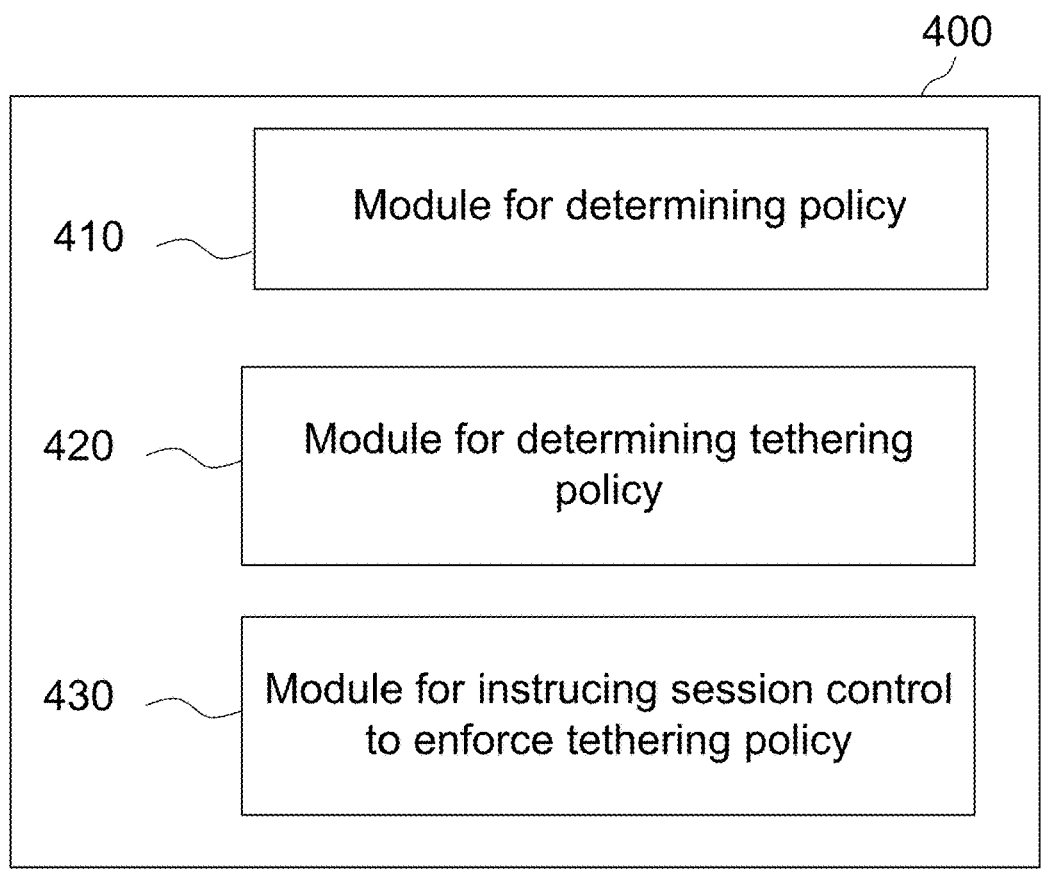
FIG. 12 shows another example schematic representation of a policy control entity controlling the policy for a data packet flow including packets originating from the use of a tethering mechanism.

FIG. 12 shows another example schematic representation of a policy control entity 400 which comprises a first module 410 configured to determine the policy for the data packet session exchanged with the user entity 70. Furthermore, a module 420 is provided configured to determine whether the policy comprises a tethering policy indicating how to handle the tethering mechanism, so that the module 420 determines the tethering policy. The policy control entity 400 furthermore comprises a module 430 configured to instruct a session control entity to enforce the tethering policy.

Figure 13:
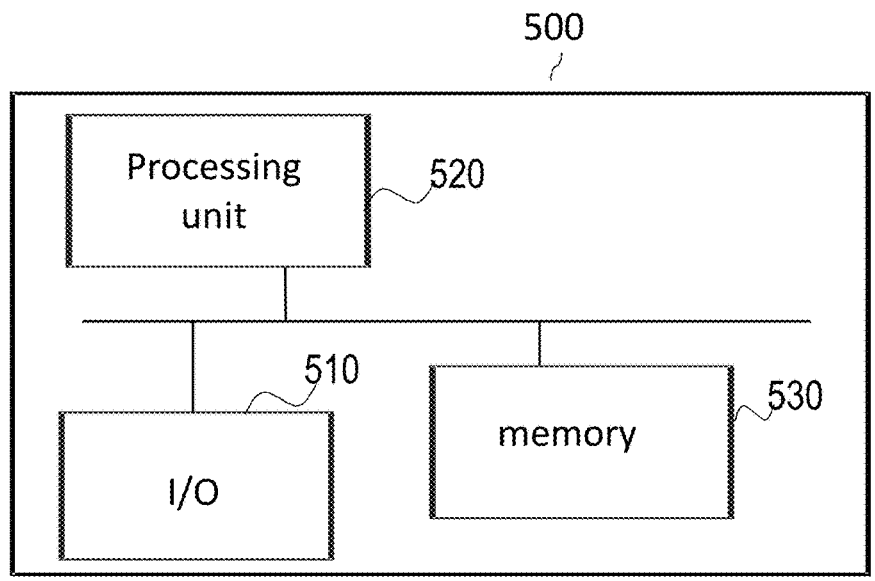
FIG. 13 shows an example schematic representation of a session control entity configured to control the data packet sessions in which a tethering mechanism is used.

FIG. 13 shows an example architectural view of a session control entity such as SMF 500 shown in FIG. 4. The session control entity 500 comprises an input/output or interface 510 configured to receive control messages or user data from other entities and configured to transmit control messages or user data to other entities. The entity furthermore comprises a processing unit 520 which is responsible for the operation of the session control entity 500. The processing unit 520 comprises one or more processors and can carry out instructions stored on a memory 530, wherein the memory may include a read-only memory, a random access memory, a mass storage, a hard disk, or the like. The memory can furthermore include suitable program code to be executed by the processing unit 520 so as to implement the above described functionalities in which the session control entity is involved.

Figure 14:
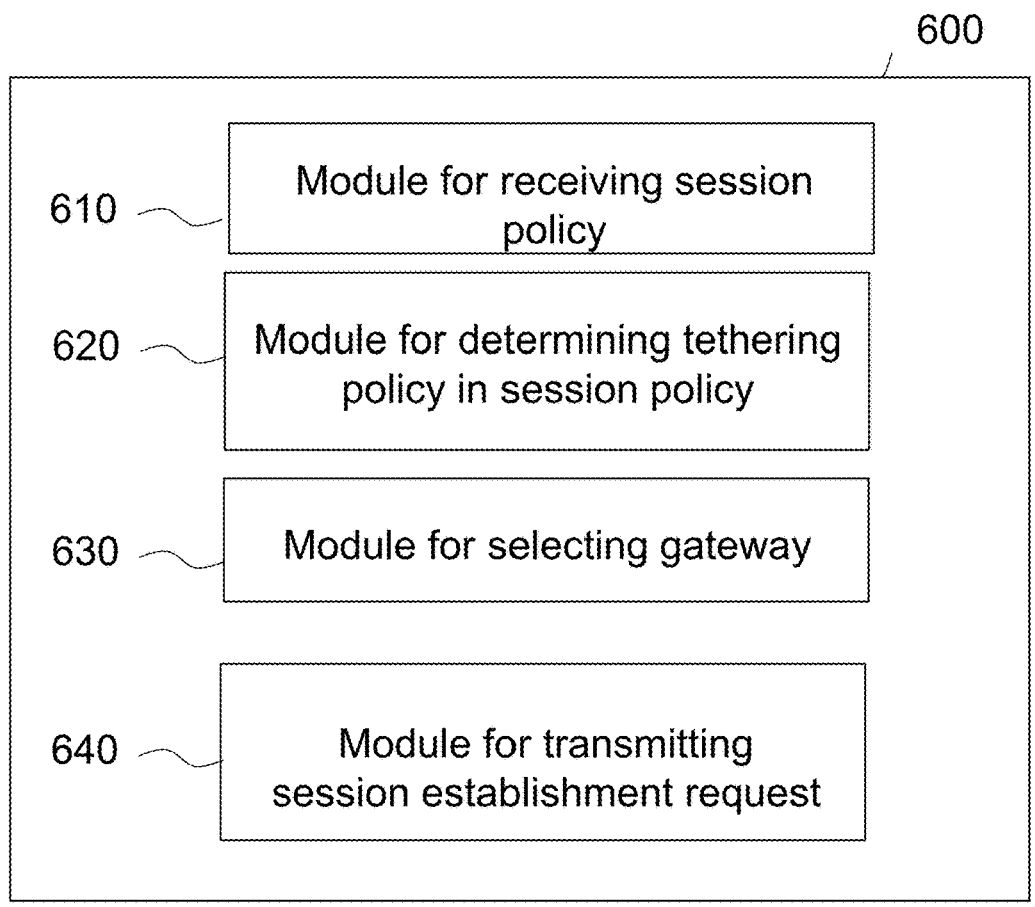
FIG. 14 shows another example schematic representation of the session control entity configured to control the data packet sessions.

FIG. 14 shows another schematic view of a session control entity which comprises a first module 610 configured to receive the session policy from the policy control entity. A module 620 is provided configured to determine whether the session policy comprises a tethering policy. Accordingly, the module 620 determines that a tethering policy should be applied. A module 630 is configured to select a gateway or user plane function which is capable of applying the tethering policy and a module 640 is provided configured to transmit a session establishment or session modification request to the selected gateway by which the gateway is instructed to apply the tethering policy.

From the above discussion some general conclusions can be drawn:

As far as the gateway 100 is concerned which blocks the use of the tethering mechanism by amending the lifetime indicator, it is possible that the lifetime of all data packets of the detected downlink data packet session are amended. Furthermore, it is possible that a transmission protocol used for transmitting the data packets of the data packet session is determined, and the lifetime indicator may only be amended when the determined transmission protocol corresponds to one of a predefined set of transmission protocols.

In this example only data packets belonging to a certain predefined transmission protocol may be amended such that they cannot be transmitted further when arriving at the first user entity.

Furthermore, it is possible to detect whether the second entity 81-84 uses the tethering mechanism to transmit data packets through the cellular network. To this end the uplink connection request from the first mobile entity 70 to the cellular network is detected and a downlink acknowledgement message in response to the uplink connection request transmitted to the first user entity is detected. Furthermore, it is determined whether a further uplink acknowledgement message in response to the detected downlink acknowledgement message is received. The use of the tethering mechanism is detected when the further uplink acknowledgement message is not received within a predefined time period after the detected downlink acknowledgement message. This was discussed above in connection with FIG. 4 in step S27 where the gateway waits for the reception of the further acknowledgement message.

The use of the tethering mechanism which is detected as described above can then be reported to a session control entity 500 of the cellular network which is configured to control the data packet session of the first user entity 70.

Furthermore, the lifetime indicator can be amended in the downlink acknowledgement message and the amended lifetime indicator is transmitted to the first user entity in the downlink acknowledgement message forwarded to the first mobile entity. This was discussed above in connection with FIG. 4 in step S25.

The gateway 100 may furthermore receive a request message from the session control entity of the cellular network requesting to establish the data packet session, wherein the request message comprises the instruction to amend the lifetime indicator of at least some of the data packets of the data packet session to be established. This was discussed above in more detail in connection with step S19 of FIG. 4.

The gateway may furthermore inform a session control entity configured to control the data packet session of the first user entity about its capability to amend the lifetime indicator in the data packets as discussed above in connection with step S11.

The data packets may be IP data packets and the lifetime indicator may be the TTL parameter.

Furthermore, it is possible to determine a data volume of the data packets exchanged via the first user entity for the subscriber. The data packets, for which the use of the tethering mechanism is detected may not be taken into account when the data volume for the subscriber is determined.

As far as the operation of the policy control entity 200 is concerned, the policy control entity 200 detects the application of the tethering policy and instructs the session control entity 500 accordingly to enforce the tethering policy. The tethering policy can comprise instructions to amend the lifetime indicator present in the data packets of a downlink data packet session transmitted to the first user entity such that the data packets for which the lifetime indicator has been amended have reached the end of the lifetime and cannot be further transmitted when arriving at the first user entity. The step of instructing the session control entity can comprise the step of informing the session control entity that the tethering policy should be enforced by amending the lifetime indicator.

The instructing of the session control entity can be implemented as part of a policy charging rule transmitted to the session control entity.

Furthermore the session control entity can be instructed to enforce the tethering policy only for a certain access technology in case of a hybrid access UOF where several access technologies can be used to access the cellular network.

As far as the session control entity 500 is concerned, the session request can be a session establishment request (e.g. a Sx Session establishment request) or a session modification request (e.g. a Sx Session Modification request). Furthermore the tethering policy can comprise instructions to amend the lifetime indicator present in the data packets of the downlink data packet session transmitted to the first user entity such that the data packets for which the lifetime indicator has been amended, have reached the end of the lifetime and cannot be transmitted further when arriving at the first user entity. The step of instructing the gateway can comprise the step of instructing the gateway to amend the lifetime indicator as discussed above in step S19 of FIG. 4.

As far as the gateway 100 is concerned which does not amend the lifetime indicator but just lowers the bandwidth when detecting the use of the tethering mechanism, the gateway 100 can detect the tethering mechanism by detecting the uplink connection request from the first mobile entity 70 to the cellular network and by detecting the downlink acknowledgement message in response to the uplink connection request transmitted to the first user entity. Furthermore, it can be determined whether a further uplink acknowledgement message in response to the detected downlink acknowledgement message is received. The use of the tethering mechanism may then be detected when the further uplink acknowledgement message is not received within the defined time period after the detected downlink acknowledgement message as discussed above in step S27 of FIG. 4.

The above discussed solutions have the following advantages. The network operator has the possibility to apply a simple solution for a flat tariff scenario by which tethering is detected, by which tethering may be blocked, or by which tethering can be reported which allows using simple UPF entities which do not have advanced tethering detection mechanisms such as TCP fingerprinting or heuristics.

Furthermore, it allows the operator to apply tethering policies in the context of 4G or 5G network supporting the control and user plane separation. The tethering policies can be provided as a policy from the control plane function or locally configured in the user plane function.

Furthermore, it allows the network operator to add a tethering package plan on top of the subscriber's plan which has a flat tariff. Furthermore, the network operator may be able to generate more revenues as different tariffs may be applied to the tethering traffic in 4G or 5G networks. Finally, it allows the network operator to control and report the tethering traffic and to apply different policies based on the traffic generated by the tethering device.

For the end-user the above described scenario has the advantage that a tethered connection is more secure than it would be at a public hotspot. The data will be sent quickly and in a secure way without being exposed to the casual snooping or other security risks possible at unsecured public hotspots.

What is claimed is:

1. A method for operating a policy control entity configured to control a policy in a cellular network applied to a first user entity for exchanging data packet sessions with the cellular network wherein the first user entity is identified by the cellular network through subscription data by which the first user entity is linked to a subscriber, the method comprising:
   determining the policy for the data packet session exchanged through the cellular network with the first user entity;
   determining whether the policy comprises a tethering policy indicating how to handle a tethering mechanism in which a second entity uses transmission capabilities of the first user entity to exchange data packets of a data packet session through the cellular network; and
   in response to determining that the policy comprises the tethering policy, instructing a session control entity configured to control the data packet sessions in which the first user entity is involved to enforce the tethering policy;
   wherein the tethering policy comprises instructions to amend a lifetime indicator present in the data packets of a downlink data packet session transmitted to the first user entity such that the data packets for which the lifetime indicator has been amended have reached the end of the lifetime and cannot be transmitted further when arriving at the first user entity;
   wherein the instructing the session control entity comprises informing the session control entity that the tethering policy should be enforced by amending the lifetime indicator.

2. The method of claim 1, wherein the instructing the session control entity is implemented as part of a Policy and Charging rule transmitted to the session control entity.

3. The method of claim 1:
   wherein different access technologies are provided for accessing the cellular network; and
   wherein the instructing the session control entity comprises instructing the session control entity to enforce the tethering policy only when the cellular network is accessed with a predefined access technology from the different access technologies.

4. A method for operating a session control entity configured to control data packet sessions of a first user entity in a cellular network; wherein the first user entity is identified by the cellular network through subscription data by which the first user entity is linked to a subscriber; the method comprising:
   receiving a session policy, from a policy control entity of the cellular network, which should be used to control a data packet session in which the first user entity is involved;
   determining whether the session policy comprises a tethering policy indicating how to handle a tethering mechanism in which a second entity uses transmission capabilities of the first user entity to exchange data packets of a data packet session through the cellular network; and
   in response to determining that the session policy comprises the tethering policy:
      selecting a gateway for handling the data packet session with the first user entity which is capable of applying the tethering policy; and
      transmitting a session request to the selected gateway instructing the gateway to apply the tethering policy;

wherein the tethering policy comprises instructions to amend a lifetime indicator present in the data packets of a downlink data packet session transmitted to the first user entity such that the data packets for which the lifetime indicator has been amended have reached the end of the lifetime and cannot be transmitted further when arriving at the first user entity; and wherein the instructing the gateway comprises instructing the gateway to amend the lifetime indicator.

5. A method for operating a gateway configured to control data packets of a data packet session exchanged in a cellular network with a first user entity which is identified by the cellular network through subscription data by which the first user entity is linked to a subscriber; wherein a second entity is connected to the first user entity via a tethering mechanism in which the second entity uses transmission capabilities of the first user entity to exchange data packets through the cellular network; the method comprising:

detecting, for an uplink connection request for a data packet session from the first mobile entity to the cellular network, that the second user entity is connected to the first user entity via the tethering mechanism and is transmitting data packets through the cellular network through the first user entity; and lowering bandwidth for the data packets of the data packet session exchanged through the cellular network to a predefined level;

wherein the detecting that the second user entity is connected to the first user entity via the tethering mechanism comprises:

detecting the uplink connection request from the first mobile entity to the cellular network;

detecting a downlink acknowledgement message in response to the uplink connection request transmitted to the first user entity; and determining whether a further uplink acknowledgement message in response to the detected downlink acknowledgement message is received; wherein the use of the tethering mechanism is detected in response to the further uplink acknowledgement message not being received within a defined time period after the detected downlink acknowledgement message.

* * * * *